United States Patent [19]

Shay et al.

[11] Patent Number: 4,801,671

[45] Date of Patent: Jan. 31, 1989

[54] PRODUCTION OF ALKALI-SOLUBLE, CARBOXYL-FUNCTIONAL AQUEOUS EMULSION THICKENERS

[75] Inventors: Gregory D. Shay, Oak Forest; Fran K. Kravitz, Chicago; Peter V. Brizgys, Hickory Hills; Mark A. Kersten, Mt. Prospect, all of Ill.

[73] Assignee: DeSoto, Inc., Des Plaines, Ill.

[21] Appl. No.: 66,311

[22] Filed: Jun. 25, 1987

[51] Int. Cl.$^4$ .................................................. C08F 2/24
[52] U.S. Cl. ...................................... 526/214; 524/813; 526/287
[58] Field of Search .................. 526/214, 287, 301

[56] References Cited

U.S. PATENT DOCUMENTS

| | | | |
|---|---|---|---|
| 3,513,120 | 5/1970 | Pohlemann | 526/287 |
| 3,781,248 | 12/1973 | Sakai | 526/287 |
| 4,384,096 | 5/1983 | Sonnabend | 526/313 |
| 4,600,761 | 7/1986 | Ruffner | 526/270 |
| 4,703,080 | 10/1987 | Shay | 524/555 |

FOREIGN PATENT DOCUMENTS 3607250 9/1986 Fed. Rep. of Germany .

*Primary Examiner*—Christopher Henderson
*Attorney, Agent, or Firm*—Dressler, Goldsmith, Shore, Sutker & Milnamow, Ltd.

[57] ABSTRACT

There is disclosed a method of carrying out an aqueous emulsion copolymerization to provide an alkali-soluble anionic copolymer having thickening characteristics while minimizing plating and grit problems in which the aqueous emulsion copolymerization of monoethylenically unsaturated monomers comprising from 15% to 50% by weight of carboxyl-functional monomer, at least about 10% by weight of monomer, preferably a urethane monomer, having surfactant characteristics, and the balance of the monomers being selected to provide a water insoluble copolymer, is carried out in the presence of a salt of an aromatic sulfonic acid, such as sodium styrene sulfonate, in an amount of from about 0.1% up to about 6.0%, by weight.

15 Claims, No Drawings

PRODUCTION OF ALKALI-SOLUBLE, CARBOXYL-FUNCTIONAL AQUEOUS EMULSION THICKENERS

DESCRIPTION

1. Technical Field

This invention relates to the production of alkali-soluble aqueous emulsion copolymer thickeners of monoethylenically unsaturated monomers comprising large proportions of carboxyl-functional monomer and a monomer, preferably a urethane monomer, having surfactant characteristics. These emulsion copolymers are difficult to produce because of copolymer plating during copolymerization and the production of grit particles. The invention includes the superior emulsion copolymer product which is now obtained and which possesses superior characteristics when used as a thickener for aqueous latex paints.

2. Background Art

Water-insoluble aqueous emulsion copolymers of monoethylenically unsaturated monomers which dissolve upon the addition of alkaline material to produce anionic copolymer thickeners because of the presence in the copolymer of large amounts of carboxyl-functional monomer and surfactant monomer having surfactant character form useful thickeners for aqueous emulsion paints. This is taught in U.S. Pat. No. 4,384,096 issued May 17, 1983 using acrylate ester monomers as the surfactant monomer. This is also taught in G. D. Shay, E. Eldridge and J. E. Kail U.S. Pat. No. 4,514,552 issued to the assignee of this application on Apr. 30, 1985.

However, the production of these copolymers has been difficult because of the large proportion of carboxyl-functional monomer which must be present. This is because some of the copolymer plates out on the walls and other reactor surfaces during the copolymerization, and grit particles form in the emulsion product. This difficulty is aggravated when a proportion of surfactant monomer is present, as in the patents referred to. In some instances, and using a urethane monomer having surfactant character, as is preferred, up to about 30% of the desired copolymer product is lost by the plating and grit formation which has been described.

The copolymerization difficulties which have been described can be tolerated. Monomer proportions can be adjusted to minimize these difficulties, but it is important to select the proportion of the monomers which are copolymerized for most effective thickening action, not to minimize production difficulties. The loss of product and the burden of cleaning the reactor can be accepted despite the added cost and the undesired reactor down time. The grit can be substantially completely removed by filtration. It is obviously desirable to overcome these difficulties, but we know of nothing in the prior art which would suggest what causes the problem or how to combat it.

Also, the prior art products possess limitations which will be discussed, and it is desired to remove these product limitations, albeit we did not know that this might be accomplished, as will also be discussed.

From a different standpoint, the urethane monomer having surfactant character would be assumed to add to the ample quantity of anionic surfactant already present to hold the suspended particles in stable emulsion during the polymerization process. The production of latex products using aqueous emulsion copolymerization does not normally encounter any significant problem. However, the copolymers under consideration in the patents noted previously include a large proportion of carboxyl-functional monomer in a copolymer which includes a significant proportion of monomer which is water insoluble, typically ethyl acrylate. The emulsion copolymerization of monomers some of which are water insoluble, and some of which exhibit extensive water solubility may be involved in causing at least some of the plating and grit formation which is encountered, albeit these difficulties are also tied up with the presence of the surfactat monomer.

Interestingly, the copolymerized emulsion is stable after it has been produced. The plating and grit-forming problem is, somehow, an aspect of the copolymerization process. It appears that the large proportion of carboxyl-functional monomer and the large proportion of the surfactant monomer somehow upsets the stability during the polymerization. The prior art does not contemplate this difficulty and it does not provide any suggestion of how to counter it.

In this invention a monoethylenically unsaturated aromatic sulfonate salt, such as sodium styrene sulfonate, is used as a copolymerizable surfactant, and this has been used in polymerization processes for an extended period of time, including emulsion polymerizations. This is illustrated in U.S. Pat. Nos. 2,913,429, 2,971,935, 3,306,871 and 3,316,200. However, these patents do not relate to the production of copolymers including large proportions of carboxyl-functional monomer or large amounts of monomer having surfactant characteristics, or the production of copolymers having thickening characteristics.

Accordingly, the polymerization problem is a serious one, and we know of no clear explanation of the nature of the difficulty or any clear suggestion of how to resolve it.

DISCLOSURE OF INVENTION

In accordance with this invention, monoethylenically unsaturated monomers comprising from 15% to 50%, preferably from 20% to 45% by weight of carboxyl-functional monomer, at least about 5%, preferably at least 20%, by weight of monomer having surfactant characteristics, preferably a urethane monomer, and the balance of the monomers being selected to provide a water insoluble copolymer, are copolymerized in aqueous emulsion in the presence of a salt of a monoethylenically unsaturated aromatic sulfonic acid, preferably sodium styrene sulfonate, in an amount of from about 0.1% up to about 6.0%, preferably from 0.2% to 1.5%, and most preferably from 0.4% to 1.0% by weight.

The surfactant monomers which may be used are set forth in U.S. Pat. Nos. 4,384,096 and 4,514,552, and these will be discussed. However, it is preferred to use urethane monomers, most especially a urethane monomer having surfactant characteristic which includes styryl unsaturation. It may be important that the sulfonic acid used also contains styryl unsaturation.

The preferred urethane monomers having surfactant characteristics are derived from monohydric nonionic surfactants having the formula:

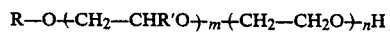

in which R is an alkyl group containing 6–22 carbon atoms (typically dodecyl) or an alkaryl group containing 8-22 carbon atoms (typically octyl phenol), R' is $C_1$–$C_4$ alkyl (typically methyl), n is an average number from about 6–150, and m is an average number of from 0–50 provided n is at least as great as m and n+m=6–150.

The preferred urethane monomers are thus nonionic urethane monomers which are the urethane reaction product of the defined monohydric nonionic surfactants with a monoethylenically unsaturated monoisocyanate, preferably one lacking ester groups like alpha, alpha-dimethyl-m-isopropenyl benzyl isocyanate (available as m-TMI from American Cyanamid). The monohydric nonionic surfactants are themselves well known and are usually ethoxylated hydrophobes containing adducted ethylene oxide to provide the hydrophilic portion of the molecule. The hydrophobes are usually an aliphatic alcohol or alkyl phenol in which a carbon chain containing at least 6 carbon atoms provides the hydrophobic portion of the surfactant. These surfactants are illustrated by ethylene oxide adducts of dodecyl alcohol or octyl or nonyl phenol which are available in commerce and which contain about 5 to about 150, preferably 10 to 60 moles of ethylene oxide per mole of hydrophobe.

The monohydric nonionic surfactant component is subject to considerable variation within the formula presented previously. The essence of the surfactant is a hydrophobe carrying a polyethoxylate chain (which may include some polypropoxylate groups) and which is terminated with a single hydroxy group. When the hydroxy-terminated polyethoxylate used herein is reacted with a monoethylenically unsaturated monoisocyanate, as has been illustrated, the result is a monoethylenically unsaturated urethane in which a polyethoxylate structure is associated with a copolymerizable monoethylenic group via a urethane linkage.

Turning to the sulfonate monomer which is used, and as a matter of interest, replacement of sodium styrene sulfonate with other available ethylenically unsaturated sulfonate, including sodium vinyl sulfonate, acrylamidomethyl propane sulfonic acid and monoethylenically unsaturated sulfosuccinates do not help the problem. Indeed, the undesired plating and grit production are actually increased when these other ethylenically unsaturated sulfonates are used. We cannot explain these puzzling results.

The salt of a monoethylenically unsaturated aromatic sulfonic acid is preferably a sodium styrene sulfonate, albeit other monovalent bases, like potassium, ammonium or a volatile amine, like diethanol amine, can be used. As previously indicated these monoethylenic acids are used in an amount of from about 0.1% up to about 6.0%, by weight. Smaller amounts are generally ineffective, and larger amounts are costly and introduce water sensitivity into the final product.

It is important that the proportion of monoethylenic sulfonic acid be minimized to reduce cost and to provide the best properties. This can be accomplished by placing at least half of the total monoethylenic sulfonic acid in the aqueous precharge to which the bulk of the monomers being copolymerized is slowly added. The proportion of monoethylenic sulfonic acid needed to minimize plating and grit formation when it is in the precharge rather than distributed with the balance of the monomers is greatly reduced, and this is important. In preferred practice, substantially all of the sulfonic acid salt is present in the precharge, and this allows the most effective use of sodium styrene sulfonate in an amount of from 0.2% to 1.5%.

In the normal practice of this invention, copolymerization is carried out in the presence of an anionic surfactant in addition to the sulfonic acid salt. The preferred anionic surfactant is a sulfosuccinate surfactant, these being illustrated in the Example of preferred practice.

It has been pointed out that there is a balance of monomers which are selected to provide a water insoluble copolymer, and these are usually $C_1$ to $C_8$ alkyl esters of (meth)acrylic acid. Ethyl acrylate is particularly desirable. These esters are usually present in an amount of at least about 10%, preferably at least about 20%.

The aqueous emulsion product is used in aqueous latex paints and these are stored in hot rooms to make sure they have adequate storage stability. Additional anionic surfactant, such as sodium lauryl sulfate in an amount of about 4% of emulsion solids is usually post-added to the emulsion product to insure hot room stability. In the preferred practice of this invention, it is found that the post-addition of surfactant is not needed, and this is a significant improvement. As a result, it is clear that the emulsion copolymer products produced by following the method of this invention possess different product characteristics from those which were produced in the absence of this invention, for those previous products required the post-addition of anionic surfactant to enable adequate hot room stability.

The invention is illustrated in the examples and tables which follow in which all parts are by weight.

EXAMPLE 1

Comparative Example of Alkali-Soluble Associative Latex Thickener Prepared Without Sodium Styrene Sulfonate Into a 3-liter glass reaction flask equipped with thermometer, stirrer, condenser, thermoregulated water bath, nitrogen inlet and pumps for continuous delivery of monomer and initiator solutions was charged 1291 grams deionized water. The water was sparged with nitrogen while heating to 80° C.

Into a separate vessel with mixing was charged 180 grams ethyl acrylate, 210 grams methacrylic acid, 233.3 grams of a 90% aqueous dispersion of macromonomer (m-TMI adduct of a 50 mole ethoxylate of nonylphenol), 26.7 grams Aerosol OT surfactant and 12.5 grams deionized water forming a hazy solution identified as a monomer premix.

Into a third vessel was charged 1.05 grams sodium persulfate in 98.95 grams deionized water. At 80° C., the nitrogen was switched from sparge to blanket, and 5.3 grams Aerosol OT was charged to the reactor followed by 66.3 grams (10%) of the monomer premix. After stabilizing the temperature for 10 minutes, 0.48 gram sodium persulfate in 4.52 grams deionized water was charged to the reactor. 40 minutes later, pumping of the monomer premix and initiator streams were started with the monomer premix being added over 2.5 hours and the initiator over 3 hours.

The product, which was then cooled and filtered, contained a moderate level of grit and the reactor was moderately plated. Total coagulum (grit+plating) for this product was 0.35% on total wet latex (1.16% on dry basis). On hot room stability testing for 10 days at 130° F., severe separation occurred (0.4 inch clear layer on top and 10 inch solid sediment on bottom of a vial containing 3 inches latex). Mechanical stability in a Hamilton Beach blender was only 6 minutes (20 minutes without gellation of coagulum is considered a passing value) with a high degree of foaming.

EXAMPLE 2

Alkali-Soluble Associative Latex Thickener With Sodium Styrene Sulfonate

Using the same equipment and general procedure of Example 1, 1291 grams of deionized water was charged to the reactor and heated to 80° C. with nitrogen sprage.

The monomer premix was prepared in a second vessel by charging 180 grams ethyl acrylate, 207 grams methacrylic acid, 233.3 grams of a 90% aqueous dispersion of macromonomer (m-TMI adduct of a 50 mole ethoxylate of nonylphenol), 26.7 grams Aerosol OT surfactant and 12.5 grams deionized water.

Into a third vessel was charged 1.05 grams sodium persulfate in 98.5 grams deionized water. At 80° C., the nitrogen was switched from sparge to blanket, and 5.3 grams Aerosol OT was charged to the reactor followd by 3.75 grams of sodium persulfate (80% active), and 65.7 grams (10%) of the monomer mix.

After stabilizing the temperature at 80° C. for an additional half hour, the product was cooled and filtered. There was no reactor plating and little filtered grit. Total coagulum (grit+plating) for this product was 0.001% on total wet latex (0.003% on dry basis). On hot room stability testing for 10 days at 130° F., there was no clear layer separation on top and only 0.1 inch of sediment on the bottom of a vial containing 3 inches of the latex. Mechanical stability in a Hamilton Beach blender was greater than 20 minutes with low foaming compared to Example 1.

TABLE I

Grit and Plating Reduction with NaSS Monomer

| Latex Run | Monomer Composition | | | | Macromonomer (MM) | | |
|---|---|---|---|---|---|---|---|
| | EA POM | MM POM | MAA POM | Sulfonate Monomer | | | |
| | | | | POM | Type | Loc. | Type* |
| 1- | 30 | 35 | 35 | 0 | None | — | DNP-50 |
| 2- | 30 | 35 | 35 | 0 | None | — | DNP-50 |
| 3- | 30 | 35 | 25 | 10 | NaSS | CNT | DNP-50 |
| 4- | 30 | 35 | 30 | 5 | NaSS | CNT | DNP-50 |
| 5- | 30 | 35 | 30 | 5 | NaSS | CNT | DNP-50 |
| 6- | 30 | 35 | 30 | 5 | NaSS | CNT | DNP-50 |
| 7- | 30 | 35 | 30 | 5 | NaSS | CNT | DNP-50 |
| 8- | 30 | 35 | 35 | 0 | None | — | NP-50 |
| 9- | 30 | 35 | 35 | 0 | None | — | NP-50 |
| 10- | 30 | 35 | 30 | 5 | NaSS | CNT | NP-50 |
| 11- | 30 | 35 | 32.5 | 2.5 | NaSS | CNT | NP-50 |
| 12- | 30 | 35 | 34 | 1 | NaSS | CNT | NP-50 |
| 13- | 30 | 35 | 34 | 1 | NaSS | PC | NP-50 |
| 14- | 30 | 35 | 34.5 | 0.5 | NaSS | PC | NP-50 |
| 15- | 30 | 35 | 34.8 | 0.2 | NaSS | PC | NP-50 |
| 16- | 30 | 34 | 35 | 1 | NaSS | PC | NP-50 |

| Polym. Surfactant | Reactor Coagulum | | Latex (@ 25%) | | 1% Aq. Solution |
|---|---|---|---|---|---|
| | Relative Plating | Grit + Plating POL | Visc. (cps) | P.S. (nm) | Visc. (cps) |
| 1-EP 110 | SLT-MD | 0.66 | 14 | 139 | 33100 |
| 2-AER-OT | SLT-MD | 0.43 | 21 | 117 | 34900 |
| 3-EP 110 | Clean | None | (515000) | 823 | 1200 |
| 4-EP 110 | Clean | 0.00 | (485) | 276 | 7000 |
| 5-EP 110 | Clean | 0.01 | 445 | 300 | 8320 |
| 6-EP 110 | Clean | 0.01 | 3375 | 286 | 6040 |
| 7-AER-OT | Clean | 0.01 | 20100 | 327 | 7440 |
| 8-AER-OT | SLT-MD | 0.32 | 33 | 166 | 7660 |
| 9-AER-OT | SLT-MD | 0.35 | 60 | 184 | 8480 |
| 10-AER-OT | Clean | 0.01 | 16000 | 310 | 2460 |
| 11-AER-OT | Clean | 0.01 | 9110 | 236 | 6000 |
| 12-AER-OT | SLT | 0.61 | 7409 | 207 | 9040 |
| 13-AER-OT | Clean | 0.01 | 1990 | 319 | 6740 |
| 14-AER-OT | Clean | 0.00 | 496 | 359 | 9360 |
| 15-AER-OT | SLT | 0.33 | 151 | 181 | 8800 |

TABLE I-continued

Grit and Plating Reduction with NaSS Monomer

| 16-None | Clean | NA | [45000] | NA | [18900] |

Notes:
(1)Latex viscosity is at 25% solids with 4 POM anionic surfactant post-added for stabilization. Total surfactant concentration is 8 POM.
(2)Viscosity values in ( )'s are at 30% without the 4 POM post-add surfactant present.
(3)Viscosity values in [ ]'s are at 25% without the 4 POM post-add surfactant present.
*The macromonomer is the reaction product of 1 mol of alpha, alpha-dimethyl-m-isopropenyl benzyl isocyanate with 1 mol of the identified monohydric nonionic surfactant monomer.

Comments:

Comparing control runs 1 and 2 with runs 3-7, the control shows slight to moderate plating and the production of a total of 0.43 to 0.66 parts of grit per 100 parts of latex solids. Runs 3-7 show the product is clean with, at most, 0.01 parts of grit per 100 parts of latex solids.

Comparing control runs 8 and 9 with runs 10-16, but using a different macromonomer, the control runs again show slight to moderate plating and the production of significant grit. Runs 10-12 show that using continuous addition of the sulfonate monomer, good results are obtained at 5% and 2.5% sulfonate monomer, but poor results when the sulfonate monomer was reduced to 1%. Runs 13-15 use a precharge of the sulfonate monomer, and now good results are obtained at 1% and 0.5% of sulfonate monomer. In run 15, poor results (but still better than the control) are obtained at only 0.2% of sulfonate monomer. Run 16 shows the absence of reactor plating using 1% of sulfonate monomer even when the polymerization surfactant has been omitted.

As a matter of interest, the latex viscosity at 1% aqueous solution viscosity shown for runs 13 and 14 are preferred values.

TABLE II

Comparison of NaSS with Other Sulfonate Monomers for Grit and Plating

| Latex Run | Monomer Composition | | | | Macromonomer (MM) | | |
|---|---|---|---|---|---|---|---|
| | EA POM | MM POM | MAA POM | Sulfonate Monomer | | | |
| | | | | POM | Type | Loc. | Type* |
| 17- | 30 | 35 | 15 | 10 | AMPS | CNT | DNP-50 |
| 18- | 30 | 35 | 25 | 10 | NaSS | CNT | DNP-50 |
| 19- | 30 | 35 | 30 | 5 | AMPS | CNT | DNP-50 |
| 20- | 30 | 35 | 30 | 5 | NaSS | CNT | DNP-50 |
| 21- | 30 | 35 | 30 | 5 | NaSS | CNT | DNP-50 |
| 22- | 30 | 34 | 35 | 1 | AMPS | PC | NP-50 |
| 23- | 30 | 34 | 35 | 1 | SVS | NP-PC | 50 |
| 24- | 30 | 34 | 35 | 1 | LF40 | PC | NO-50 |
| 25- | 30 | 35 | 34 | 1 | NaSS | PC | NP-50 |

| Polymer. Surfactant | Reactor Coagulum | | Latex (@ 25%) | | 1% Aq. Solution |
|---|---|---|---|---|---|
| | Relative Plating | Grit + Plating POL | Visc. (cps) | P.S. (nm) | Visc. (cps) |
| 17-EP-110 | V Hvy | High | NA | NA | NA |
| 18-EP-110 | Clean | None | (515000) | 823 | 1200 |
| 19-EP-110 | V Hvy | 2.53 | NA | 356 | 14000 |
| 20-EP-110 | Clean | 0.00 | (485) | 276 | 7000 |
| 21-EP-110 | Clean | 0.01 | 445 | 300 | 8320 |
| 22-AER-OT | Slt | 11.0 | 24 | 346 | 22 |
| 23-AER-OT | Slt | V High | NA | NA | NA |
| 24-AER-OT | Slt | 8.40 | 46 | 210 | [3500] |

TABLE II-continued
Comparison of NaSS with Other Sulfonate Monomers for Grit and Plating

| 25-AER-OT | Clean | 0.01 | 1990 | 319 | 6740 |

Notes:
(1)Same as for Table 1.
(2)Same as for Table 1.
(3)Same as for Table 1.
*Same as for Table 1.
(4)SVS inhibited polymerization with no initial exotherm. Additional redox initiator was required for polymerization.

Comments:
Comparing control run 17 which uses a different sulfonic monomer with run 18 which uses a sulfonate monomer of this invention, the invention run 18 produced a clean product with no grit, while the control produced a very heavy plating with a large proportion of grit.

Control run 19 is similar to control run 17 using 5% sulfonic monomer, and is again a complete failure. In contrast, and using the same 5% of the sulfonate monomer of this invention, runs 20 and 21 produce a clean product with essentially no grit.

Runs 22–25 show various sulfonic monomers used at 1% concentration. Only run 25 which used a sulfonate monomer in accordance with this invention produced satisfactory results.

TABLE III
Latex Thickener Hot Room Stability at 130° F.
(Composition = EA/MM/(MAA + NaSS) = 30/35/35)

| Latex Run | NaSS Monomer Conc (POM) | Loc. | Latex Conc (%) | Post-Add Surf *(POM) | Hot Room Stability(X/Y) 10 Days | 20 Days | 50 Days |
|---|---|---|---|---|---|---|---|
| | | | | | (Ins Sep in 2.5 Ins Ltx) | | |
| 9A- | 0 | — | 30 | None | 0.4/1.0 | TT | TT |
| 9B- | 0 | — | 25 | None | 0.5/0.0 | 1.0/1.0 | TT |
| 9C- | 0 | — | 25 | 4.0 | 0/0 | 0/0 | 0.2/0.1 |
| 15A- | 0.2 | PC | 30 | None | NT | NT | NT |
| 15B- | 0.2 | PC | 25 | None | 0/0 | 0/0 | 0.3/0.15 |
| 15C- | 0.2 | PC | 25 | 4.0 | 0/0 | 0/0 | 0/0 |
| 14A- | 0.5 | PC | 30 | None | 0/0.1 | 0/0.2 | 0/0.3 |
| 14B- | 0.5 | PC | 25 | None | 0/0.1 | 0/0.1 | 0/0.2 |
| 14C- | 0.5 | PC | 25 | 4.0 | 0/0.1 | 0/0.1 | 0/0.1 |
| 13A- | 1.0 | PC | 30 | None | 0/0.1 | 0/0.1 | 0/0.1 |
| 13B- | 1.0 | PC | 25 | None | 0/0.1 | 0/0.1 | 0/0.1 |
| 13C- | 1.0 | PC | 25 | 1.0 | 0/0 | 0/0 | 0/0 |
| 12A- | 1.0 | CNT | 25 | 4.0 | 0/0 | 0/0 | 0/0.05 |

Notes:
X denotes inches of clear separation at top of sample.
Y denotes inches of solid separation at bottom of sample
NT denotes "Not Tested"
TT denotes "Test Terminated" due to early failure
*denotes Alcolac Sipex LCP (sodium lauryl sulfate)

Comments:
In runs 9A–9C, no sulfonate monomer was used, and the hot room stability was poor, except in run 9C where surfactant was post-added.

In the remaining runs, the hot room stability was very good to excellent in the absence of any surfactant post-add, so this undesired addition can be avoided.

TABLE IV
Latex Thickener Mechanical Stability and Foaming
(Monomer Composition = EA/MM/(MAA + NaSS) = 30/35/35)

| Latex Run | NaSS Monomer Conc (POM) | Loc | Latex Conc (%) | Post-Add Surf *(POM) | Mechanical Stability Stab! (Min) | Foaming** (Rel) |
|---|---|---|---|---|---|---|
| 3975-20 | 0 | — | 25 | None | 6 approx. | High |
| 9D- | 0 | — | 25 | 4.0 | 6 approx. | V. High |
| 14D- | 0.5 | PC | 25 | None | 20 | Low |
| 14E- | 0.5 | PC | 25 | 4.0 | 20 | Moderate |
| 13D- | 1.0 | PC | 25 | None | NT | NT |
| 13E- | 1.0 | PC | 25 | 4.0 | 20 | Moderate |

! Time in high speed blender for total coagulation. Maximum test time was 20 min., so 20 indicates no failure.
**Foaming in blender during mechanical stability test.

Comments:
In the absence of sulfonate monomer, the mechanical stability was poor and the foaming was high to very high. In contrast, and in this invention, the stability was much improved and foaming was reduced. In run 14D-, these improved results are obtained in the absence of any post-added surfactant, and the foam-resistance was better in the absence of post-added surfactant.

DEFINITIONS OF ABBREVIATIONS IN TABLES I–IV

| Abbreviation | Definition |
|---|---|
| AER-OT | AEROSOL OT (Trade Name) Anionic Surfactant |
| AMPS | Acrylamide Methyl Propane Sulfonic Acid |
| CNT | Continuous Addition of Sulfonate Monomer |
| CONC | Concentration |
| cps | Centipoises |
| DNP | Dinonyl Phenol |
| EA | Ethyl Acrylate |
| EP-110 | ALIPAL EP-110 (GAF), anionic surfactant |
| HT | High Temperature |
| HVY | Heavy |
| KU | Kreb's Units |
| LEV | Leveling |
| LF40 | TREM LF-40 (Diamond Shamrock), alkyl allyl sulfosuccinate monomer |
| Loc. | Location of sulfonate addition |
| MAA | Methacrylic Acid |
| MD | Moderate |
| MM | Macromonomer |
| MON | Monomer |
| MS | Mechanical Stability |
| NA | Not Available |

-continued

| DEFINITIONS OF ABBREVIATIONS IN TABLES I-IV | |
|---|---|
| Abbreviation | Definition |
| NaSS | Sodium p-Styrene Sulfonate (Spinomar NaSS from Toyo Soda Mfg. Co. Ltd.) |
| nm | Nanometers |
| NP | Nonyl Phenol |
| PC | All Sulfonate Monomer in Reactor Pre-Charge |
| POL | Parts per 100 parts of latex |
| POLYM | Polymerization |
| P.S. | Particle Size (Coulter N-4 Cumulant) |
| RT | Room Temperature |
| SLT | Slight |
| SOL | Solution |
| SURF | Surfactant |
| SVS | Sodium Vinyl Sulfonate (Air Products) |
| TP | Test in Progress |
| TT | Test Terminated |
| V | Very |
| Visc. | Viscosity (Brookfield 10 rpm) |
| WK | Week |

What is claimed is:

1. A method of carrying out an aqueous emulsion copolymerization to provide an alkali-soluble anionic copolymer having thickening characteristics while minimizing plating and grit problems comprising, copolymerizing in aqueous emulsion monoethylenically unsaturated monomers comprising from 15% to 50% by weight of carboxyl-functional monomer, at least about 5% by weight of monomer having surfactant characteristics, and the balance of the monomers being selected to provide a water insoluble copolymer in the presence of a salt of a styrene sulfonic acid said salt derived from monovalent bases in an amount of from about 0.1% up to about 6.0%, by weight.

2. The method of claim 1 in which the monomer having surfactant characteristics is a urethane monomer present in an amount of at least 20%, by weight.

3. The method of claim 2 in which said urethane having surfactant characteristics includes styryl unsaturation.

4. The method of claim 1 in which said styrene sulfonic acid is sodium styrene sulfonate.

5. The method of claim 1 in which said sodium styrene sulfonate is present in an amount of from 0.2% to 1.5%.

6. The method of claim 1 in which said sodium styrene sulfonate is present in an amount of from 0.4% to 1.0%.

7. The method of claim 1 in which said carboxyl-functional monomer is present in an amount of from 20% to 45% by weight.

8. The method of claim 7 in which said monomers selected to provide a water insoluble copolymer are $C_1$ to $C_8$ alkyl esters of (meth)acrylic acid present in an amount of at least 10%.

9. The method of claim 8 in which said monomers selected to provide a water insoluble copolymer are present in an amount of at least 20%.

10. The method of claim 8 in which said alkyl esters of (meth)acrylic acid are constituted by ethyl acrylate present in an amount of at least 20%.

11. The method of claim 1 in which at least half of said salt of styrene sulfonic acid is present in an aqueous precharge to which the remainder of said monomers is slowly added.

12. The method of claim 1 in which said sulfonic acid is sodium styrene sulfonate present in an amount of from 0.2% to 1.5%.

13. The method of claim 11 in which said sulfonic acid is substantially all present in said precharge.

14. The method of claim 1 in which said copolymerization is carried out in the presence of an anionic surfactant.

15. The method of claim 14 in which said anionic surfactant is a sulfosuccinate.

* * * * *

UNITED STATES PATENT AND TRADEMARK OFFICE
CERTIFICATE OF CORRECTION

PATENT NO. : 4,801,671
DATED : January 31, 1989
INVENTOR(S) : Gregory D. Shay et al.

It is certified that error appears in the above-identified patent and that said Letters Patent is hereby corrected as shown below:

Claim 12, line 1, change the dependency from "claim 1" to: -- claim 11 --.

Signed and Sealed this

Seventh Day of November, 1989

*Attest:*

JEFFREY M. SAMUELS

*Attesting Officer*  Acting Commissioner of Patents and Trademarks